United States Patent [19]

Ealey et al.

[11] Patent Number: 4,906,087

[45] Date of Patent: Mar. 6, 1990

[54] MAGNETO-RETRACTIVE DEFORMABLE MIRROR

[75] Inventors: Mark A. Ealey, Ayer; Victor G. Salemme, Concord, both of Mass.

[73] Assignee: Litton Systems, Inc., Lexington, Mass.

[21] Appl. No.: 367,084

[22] Filed: Jun. 16, 1989

[51] Int. Cl.$^4$ .............................................. G02B 5/08
[52] U.S. Cl. ............................ 350/611; 350/DIG. 3; 350/607
[58] Field of Search ............... 350/607, 608, 609, 610, 350/611, DIG. 3; 335/286, 287

[56] References Cited

U.S. PATENT DOCUMENTS

| | | | |
|---|---|---|---|
| 2,287,286 | 6/1942 | Bing et al. | 335/288 |
| 4,655,563 | 4/1987 | Plante et al. | 350/611 |
| 4,679,915 | 7/1987 | Kriz et al. | 350/610 |
| 4,734,557 | 3/1988 | Alfille et al. | 350/608 |

OTHER PUBLICATIONS

Everson et al., "Device Parameters and Optical Performance of a Stacked Actuator Deformable Mirror" SPIE, vol. 228, Active Optical Devices and Applications (1980) pp. 34-40.

Primary Examiner—Bruce Y. Arnold
Assistant Examiner—R. D. Shafer
Attorney, Agent, or Firm—Michael H. Wallach; Robert F. Rotella

[57] ABSTRACT

A construction for a deformable mirror is disclosed in which permanent magnets are used to both retain actuators used to selectively deform the faceplate's reflecting surface within the mirror's base and to retain the mirror's faceplate to each of the actuators. The faceplate may be removed from the base by rotating each of the actuator's within its mounting hole to disrupt the magnetic circuit between each actuator and ferrous elements on the faceplate. Removal of one or more actuators from the base without disturbing the faceplate may be effected by rotation of the actuators to be removed to disconnect magnets in plugs used to support each actuator within the base from ferrous elements in the base.

12 Claims, 2 Drawing Sheets

MAGNETO-RETRACTIVE DEFORMABLE MIRROR

BACKGROUND OF THE INVENTION

1. Field of the Invention

This invention relates to deformable mirrors in general, and more particularly to deformable mirrors having replaceable actuators for deforming the mirror's reflecting surface.

2. Summary of the Prior Art

It is well known in the prior art to use deformable mirrors to correct optical signals for aberrations introduced into a wavefront due to the transmission of an optical signal through a distorting medium, e.g. the Earth's atmosphere. Such deformable mirrors may be used, for example, to correct aberrations introduced into laser signals or optical images imaged by a telescope as they pass through the Earth's atmosphere, or to introduce known aberrations into a laser signal prior to its transmission through the earth's atmosphere. See, for example, the article by J. F. Reintjes entitled: "Nonlinear and Adaptive Techniques Control Laser Wavefronts:" appearing in the December, 1988 issue of *Laser Focus/Electro-Optics* magazine. Examples of deformable mirrors which may be used to perform the foregoing function appear in U.S. Pat. Nos. 3,904,274 and 4,657,358 which are owned by the assignee of the present invention and the teachings of which are incorporated herein by reference. Mirror's of the foregoing type employ a plurality of actuators, for example piezoelectric actuators, which are independently operable to selectively deform areas of a deformable reflecting surface to correct known anomalies contained in an impinging optical signal's wavefront. Signals for driving the actuators to correct the aberrated wavefront ma be provided by a wavefront sensing and correction system such as that described in U.S. Pat. No. 3,923,400, the teachings of which are also incorporated herein by reference.

As noted in U.S. Pat. No. 4,657,358, actuators for use in controlling a deformable mirror may be manufactured from stacks of electrodistortive material, for example lead magnesium niobate (PMN) or lead zirconate titanate (PZT). The electrodistortive material is interleaved in the stack with alternating layers of electrical conductors to permit the application of an electrical signal to the material.

Most prior known deformable mirrors which utilize stacked electrodistortive material to provide control of the mirror's reflecting surface have been constructed with the actuators rigidly fastened to the member containing the mirror's reflecting surface, for example by cement or a frit bond. Such construction has not provided for ease of repair of a deformable mirror in the event of a failure of one or more actuators. In the event of the failure of an actuator due, for example, to the mechanical breakage of an actuator or to the failure of electrical contacts between one or more layers of electrodistortive material, the components of the mirror had to be carefully disassembled to effect the removal and replacement or repair of the failed actuator. Such a disassembly procedure is time consuming, frequently difficult and often impossible to effect due to the spacing between adjacent actuators and the need to prevent damaging good actuators during the repair procedure. Consequently, there is a need for a deformable mirror which utilizes electrically operated actuators which may be easily and quickly replaced without damaging other actuators during the replacement procedure In a related patent application, Ser. No. 266,616 filed Nov. 3, 1988, owned by the owner of the present patent application and the teachings of which are incorporated herein by reference, a construction for a deformable mirror is disclosed in which the mirror's electrodistortive actuators may be easily removed from the mirror's base or support structure for purposes of calibrating and/or replacing one or more of the mirror's actuators. Each actuator includes a threaded portion which is received in a threaded aperture in the base. The position of each actuator with respect to the mirror's deformable reflecting surface may be adjusted by screwing the actuator into its threaded aperture until the top of the actuator just contacts the structure supporting the reflecting surface without deflecting the surface. Further adjustment of the position of each actuator with respect to the mirror's reflecting surface may be used to control the initial (or rest) shape of the mirror's reflecting surface.

While a mirror having replaceable actuators as described above has the advantage of permitting the replacement of one or more of the mirror's actuators, to take advantage of such construction the mirror is required to have a flexible spring-type membrane attached to the mirror's faceplate to maintain the contact between the faceplate and the actuators which would normally be supplied by mechanically fastening the actuators to the faceplate. The present invention avoids the need for a flexible membrane to provide the restoring force to maintain intimate contact between the faceplate and the actuators.

SUMMARY OF THE INVENTION

Accordingly, a principal object of the disclosed invention is to provide a construction for a deformable mirror in which the mirror's electrically operable actuators are easily replaced.

Another object is to provide a deformable mirror in which the mirror's reflecting surface may be quickly and easily removed from the actuators with a minimum of skilled labor to permit the convenient cleaning, polishing or replacement of the reflecting surface.

Another object is to provide a deformable mirror which does not require complicated tools to disassemble the mirror's reflecting surface from the actuators.

The above and other objects and advantages of the invention are achieved in a deformable mirror having a flexible faceplate with a reflective front surface for reflecting optical signals therefrom. The faceplate is fastened to a base and supported above the base by a plurality of electrically operable actuators which may be selectively operated to deform the faceplate's reflecting surface. The rear surface of the faceplate includes ferromagnetic elements located above each actuator. Each actuator has a permanent magnet fastened to its end which contacts the faceplate. The faceplate is retained to the actuators by the magnetic attraction between the ferromagnetic elements on the rear surface of the faceplate and the magnets on each actuator. The magnets and ferromagnetic elements are shaped so that they will disengage from each other if rotated 90 degrees about the longitudinal axis of the actuator. Each actuator is fastened at its end distant from the end contacting the faceplate to a cylindrical plug having of four non-magnetic quadrants separated by four magnetic quadrants. Each plug is received in an aperture in the mirror's base. Four high permeability elements are spaced at 90° intervals about each aperture in the base, corresponding to the spacing of each of the magnetic quadrants on each plug. The end of the plug distant from the actuator contains a slot to permit it to b engaged by a tool, for example a screwdriver.

Each actuator is retained in its respective aperture in the base and the faceplate is retained to the actuators by aligning the magnets on the top of each actuator and in each plug so that the magnets align with the ferromagnetic elements on the faceplate and with the ferromagnetic elements in the base positioned around each aperture. Each plug is consequently retained in its respective aperture by the attraction between the ferromagnetic elements in the base and the magnets on the plug and the faceplate is held to each actuator by the attraction between the magnet at the end of each actuator and the respective ferromagnetic element located on the faceplate over each actuator.

One or more actuators may be removed by engaging a tool into the slotted end of the plug supporting the actuator to be removed and rotating the plug and its attached actuator. Rotation of the actuator 45° will disengage the actuator from the faceplate. Continued rotation of the plug through a second 45° increment (total of 90°) will disengage the actuator from the base and permit its removal from the base. The faceplate may be removed by rotating each actuator of the deformable mirror 45° to permit disengagement of the actuators from the faceplate while the actuator continue to be retained in the base.

BRIEF DESCRIPTION OF THE DRAWINGS

The above objects and other advantages of the invention will be appreciated after review of the detailed description of a preferred embodiment when read in conjunction with the drawing in which.

DETAILED DESCRIPTION OF A PREFERRED EMBODIMENT

Figure 1:
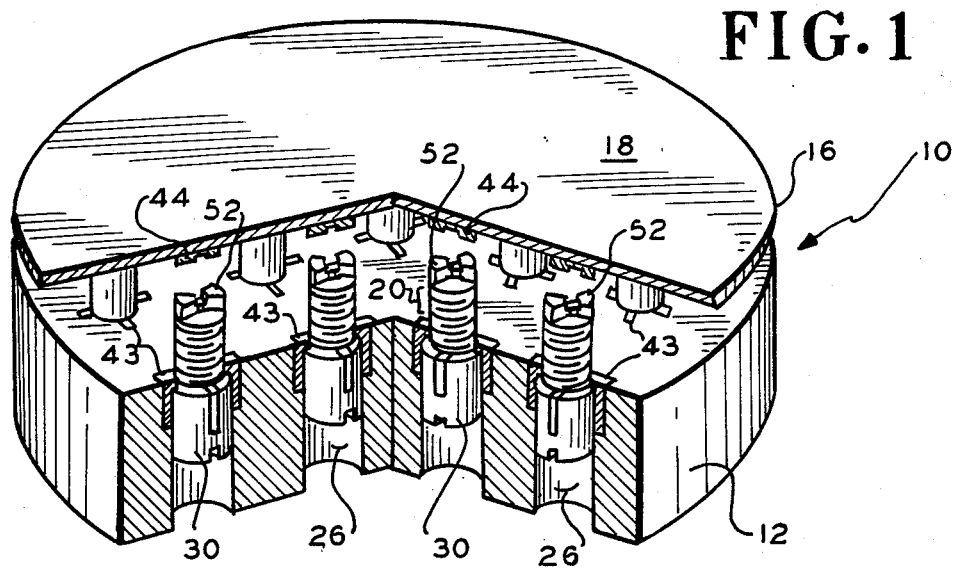
FIG. 1 is a perspective view partly in section showing a deformable mirror having actuators made in accordance with the disclosed invention.
Figure 4A:
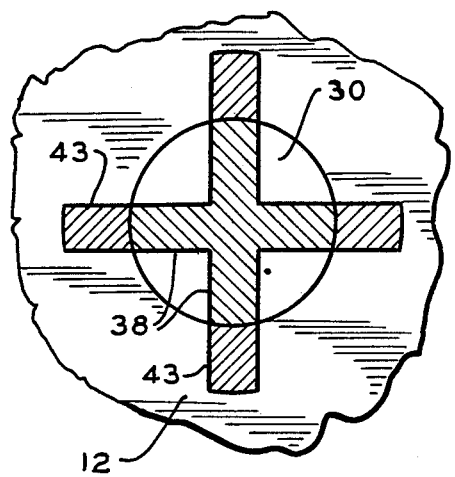
FIG. 4a is a top view showing the alignment of a plug in the base when the plug is to be retained in the base.
Figure 4B:
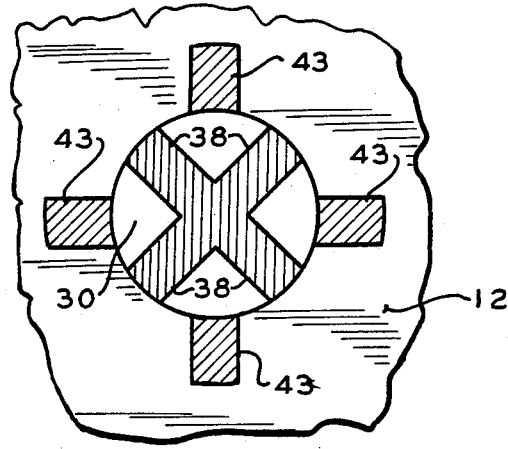
FIG. 4b is a top view showing how rotation of the plug relative to the base permits removal of a plug from the base.

Referring to the drawing, FIG. 1 shows a deformable mirror 10 constructed in accordance with the teachings of the invention. The mirror 10 includes a base 12 preferably manufactured from a material having a low coefficient of thermal expansion, for example Invar or silicon. Supported above the base 12 by a plurality of actuators, each shown generally at 14, is a faceplate 16 having a reflecting surface 18 on the front face thereof and a rear surface 19. Preferably the faceplate 16 is manufactured from a material having a low coefficient of thermal expansion, for example ultra low expansion glass or silicon, which may be easily polished.

Figure 2:
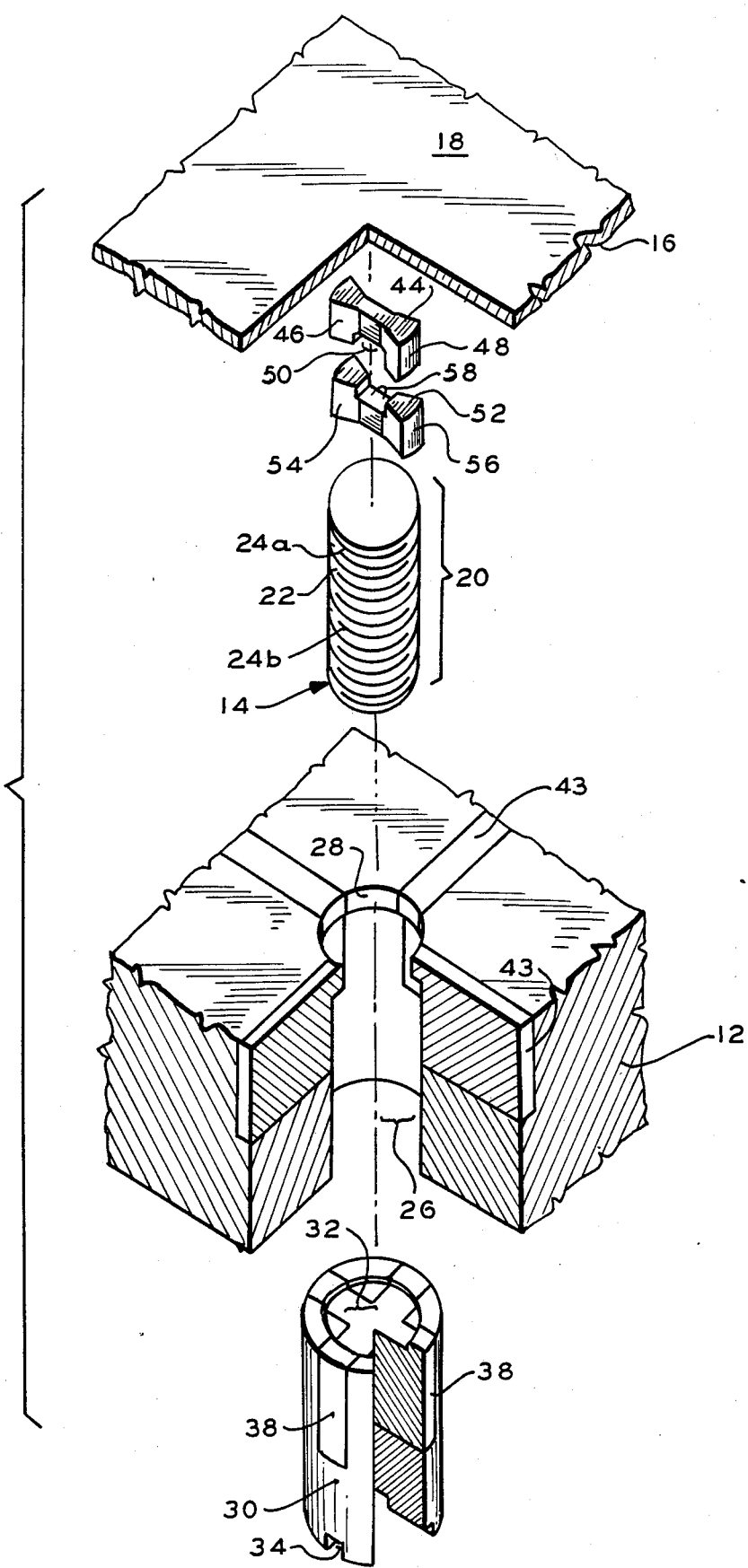
FIG. 2 is a perspective view of a portion of the mirror of FIG. 1.

As shown in FIG. 2, each actuator 14 includes a body portion 20 which is comprised of a plurality of layers 22 of electrodistortive material, for example lead magnesium niobate (PMN) or lead zirconate titinate (PZT). Interleaved between the layers 22 are alternating layers 24a and 24b of electrical contacts, for example platinum, to permit electrical signals to be applied to each of the layers 22. The foregoing construction results in the layers 22 being connected to each other mechanically in series and electrically in parallel. The contacts 24a and 24b are connected through control electronics to a controlled D.C. source of voltage (not shown).

Figure 3:
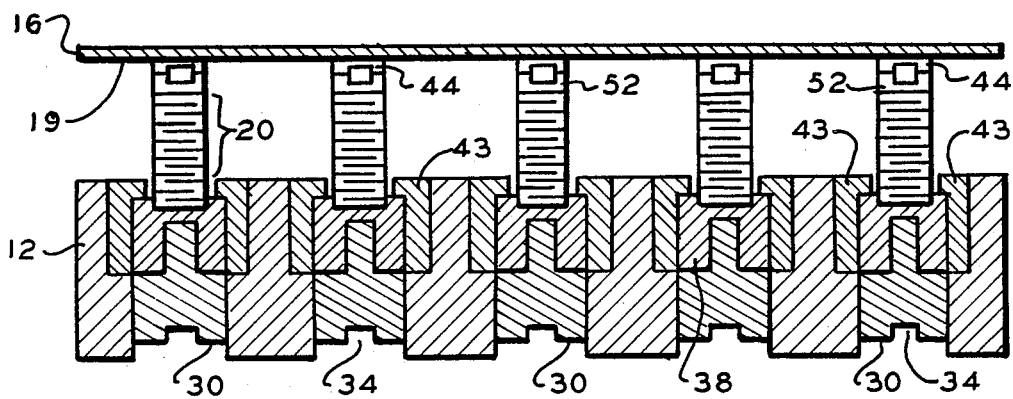
FIG. 3 is a side view in section of the deformable mirror of FIG. 1.

FIGS. 1 and 3 show that the base 12 includes a series of apertures 26. Each aperture 26 includes a shoulder portion 28 at the top of the aperture. The apertures 26 are located in positions on the base corresponding to locations beneath the faceplate 16 to be contacted by actuators 14. Each actuator 14 is supported in its respective aperture 26 on a plug 30 (FIG. 2 having a depression 32 in one end thereof to receive one end of an actuator 14. Preferably each actuator 14 is retained to its respective plug 30 by an epoxy cement. The other end of the plug 30 has a slot 34 to permit rotation of the plug 30 by selectively engaging a tool (for example a screwdriver blade) into the slot 34. Each plug 30 includes a body portion made from a non-magnetic material, for example a plastic compound. Preferably the plug 30 also contains four magnetic elements 38 made from a permanent magnetic material, for example neodymium-iron-boron (NdFeB) or samarium cobalt (SmCO$_5$). The plug 30 also contains one or more slots or holes through which leads may be passed (not shown) to connect the alternating layers 24a and 24b of the actuator to the control electronics. The diameter of each of the plugs 30 is chosen to permit each plug 30 to fit into the apertures 26 and to be freely rotated within the apertures but to be trapped from passing through the apertures 26 by the shoulder 28.

The base 12, has a series of four slots around each aperture 26. Each slot contains an element 43 manufactured from a ferromagnetic material, for example from high permeability steel. The slots are spaced around each aperture 26 to permit their alignment with the magnetic elements 38 in each plug 30 when the plug 30 is at the top of the aperture and is pressing against the shoulder 28.

The rear surface 19 of the faceplate 16 has actuator attachment pads 44 fastened to the faceplate 16 at locations corresponding to the positions at which each actuator 14 is to contact the faceplate 16. Preferably each attachment pad 44 is elongated and is manufactured from a high permeability steel and includes quadrants 46, 48 at the extremities thereof and a center aperture 50. The top of each actuator 14 has fastened thereto a permanent magnet 52 manufactured, for example, from NdFeB or SmCO$_5$. Preferably the shape of each magnet 52 is elongated and substantially corresponds to the shape of each attachment pad 44 and includes quadrants 54, 56 and a center aperture 58.

In the preferred embodiment disclosed herein, each quadrant 46, 48 and the pads 44 has an arc of approximately 45° and each quadrant 54, 56 and each magnet 52 has a corresponding arc of approximately 45°. During installation of each actuator 14, the plug 30 is aligned so that each magnet 52 is aligned beneath a corresponding pad 44, thereby assuring retention of the faceplate 16 to the actuators 14 by the magnet attraction of each magnet 52 to its respective pad 44. Each actuator 14 is retained in its respective aperture 26 by aligning the magnets 38 with the steel elements 43.

The construction disclosed herein permits convenient removal of an individual actuator 14 without the need to disassemble the entire mirror. Such removal may be effected by engaging a tool to slot 34 and rotating plug 30 through an angle of 45° to open the magnetic circuit between magnet 52 and pad 44 and between magnet 38 and elements 43. Actuator 14 will thereafter slide out of its aperture 26 and may be repaired. If it is desired to remove the faceplate 16 from the deformable mirror while the actuators 14 continue to be retained in the base 12, each plug 30 is rotated through an angle of 90°, thereby interrupting the magnetic circuit between each magnet 52 and its respective pad 44 but maintaining continuity in the magnetic circuit formed by the magnet 38 and the elements 43.

While a preferred embodiment has been described herein in sufficient detail to permit one skilled in the art to understand and to make the claimed invention, it should be apparent that the teachings and disclosure of the present invention will suggest many other embodiments and variations to those skilled in the art. For example, the actuator attachment pads 44 on the rear surface of the faceplate could be manufactured from a magnetic material and each actuator could be fitted at its top with an element manufactured from a material having a high magnetic permeability. Similarly, the magnetic elements in each plug 30 could be interchanged with the elements 43 surrounding each aperture 26. It is intended that all such embodiments be covered by the permissible scope of coverage of the patent, and that the breadth of such coverage only be limited by the claims appended hereto.

We claim:

1. A deformable mirror having a continuous reflecting surface for reflecting optical signals including:
   a. A base having a plurality of holes passing therethrough;
   b. A faceplate supported above said base, said faceplate having a first side with a smooth reflecting surface for reflecting optical signals therefrom and a second side behind said reflecting surface; said faceplate manufactured from a material which permits the reflecting surface to be distorted in a controlled manner by selective application of mechanical forces to said faceplate;
   c. A first pair and a second pair of ferrous elements on said base proximate to each of said holes passing through said base, said first and second pairs of elements being positioned around the circumference of each hole;
   d. A plug slidably receivable in each of said holes, each of said plugs having at least two permanent magnets located around the circumference of said plug at locations corresponding to the positions of the ferrous elements surrounding each hole in said base;
   e. A shoulder surrounding at least a portion of each hole in said base, each of said shoulders retaining one plug in each of said holes when said plugs are positioned against said shoulders;
   f. Attachment pads fastened to the second side of said faceplate at locations above the holes in the base when the faceplate is positioned over said base, each of said attachment pads manufactured from a ferrous material and having first and second quadrants located at the extremities of said attachment pad and a central aperture located between said first and said second quadrants;
   g. Electrodistortive actuators fastened to each of said plugs and located between said base and said faceplate to support said faceplate above said base, said electrodistortive actuators capable of changing their length by applying an electrical signal thereto, each of said actuators having a top portion near the second side of said faceplate;
   h. Permanent magnet means fastened to the top of each of said actuators, each of said permanent magnet means having first and second quadrants located at the extremities of said permanent magnet means and a central aperture located between first and said second quadrants, said first and said second quadrants of said permanent magnet means being substantially similar in shape to the first and second quadrants of said attachment pads, each of said permanent magnet means positioned in each of said actuators to allow the first and second quadrants of each attachment pad to become magnetically latched onto the first and second quadrants of the permanent magnet means positioned beneath each said attachment pad when the permanent magnets in said plug are aligned with the first pair of ferrous elements surrounding each hole in said base and to become magnetically separated from the permanent magnet means when said plug is rotated so that the magnets in said plug are not aligned with said first pair of ferrous elements;
   whereby each actuator is retained in said base by the magnetic attraction between the permanent magnets in each of said plugs and at least one pair of ferrous elements located around the circumference of each hole, and the faceplate is retained to the base by the magnetic attraction between each attachment pad and the permanent magnet means fastened to the top of each actuator.

2. The deformable mirror of claim 1 wherein each plug contains at least four permanent magnets, said permanent magnets being positioned to magnetically engage said first and said second pairs of ferrous elements when said permanent magnet means on said actuators are magnetically coupled to said attachment pads on said faceplate.

3. The deformable mirror of claim 2 wherein said permanent magnet means fastened to the top of an actuator are magnetically disengaged from said attachment pad on said faceplate by rotating said plug so that the permanent magnets in said plug are aligned with the second pair of ferrous elements, thereby permitting said plug to be retained in said base by the magnetic attraction between the permanent magnets in said plug and the second pair of ferrous elements in said base.

4. The deformable mirror of claim 1 wherein each of said plugs further includes means on the end opposite said actuator to permit said plug to be engaged and rotated within the hole in which said plug is retained in said base.

5. The deformable mirror of claim 1 wherein each of said plugs has a depression on the top portion thereof to receive and retain a portion of the actuator fastened to each plug.

6. The deformable mirror of claim 2 wherein the first and second pairs of ferrous elements comprise at least a portion of the shoulder used to retain each plug within the base.

7. The deformable mirror of claim 6 wherein said first and second pairs of ferrous elements are spaced at 90° intervals around each of said holes in said base.

8. A deformable mirror having a continuous reflecting surface which can be selectively deformed to correct aberrated optical wavefronts comprising:
   a. A base having a plurality of shouldered apertures passing therethrough;
   b. Support means slidably receivable in each of said apertures, each of said support means having at least four magnetic elements spaced around the circumference of each of said support means;
   c. Complementary magnetic elements in said base spaced around the circumference of each aperture in the base at positions to allow said complementary magnetic elements to magnetically interact with the magnetic elements of each of said support means when each of said support means are in the apertures in said base and the magnetic elements in said support means are aligned with the complementary magnetic elements in the base;
   d. A flexible faceplate supported above said base for reflecting optical signals therefrom;
   e. A plurality of actuators whose length may be varied by applying an electrical signal to each of said actuators, said actuators supporting said faceplate above said base and being capable of selectively inducing deformations in said faceplate upon selective application of electrical signals applied to said actuators, each of said actuators being fastened to and supported by said support means in said base;
   f. Magnetic fastening means attached to the end of each actuator supporting said faceplate, each of said magnetic fastening means aligned in a first direction and fastened to said actuator;
   g. Complementary magnetic attachment means fastened to said faceplate at locations where said faceplate is to be supported by each of said actuators said complementary magnetic attachment means also aligned in said first direction and fastened to said faceplate, said magnetic fastening means and said complementary magnetic attachment means magnetically latched to each other to retain said faceplate to each of said actuators when said actuators are in aligned in said first direction and said magnetic fastening means being detachable from said complementary magnetic attachment means when said support means are rotated in order to rotate said magnetic fastening means perpendicular to said first direction to release said faceplate.

9. The deformable mirror of claim 8 wherein each aperture in said base has four complementary magnetic elements and each support means has four magnetic elements.

10. The deformable mirror of claim 9 wherein said magnetic fastening means and said complementary magnetic attachment means each include an open center section in which magnetic attraction between said magnetic fastening means and said complementary magnetic attachments means is minimized.

11. The deformable mirror of claim 10 wherein each of said magnetic fastening means is a permanent magnet.

12. The deformable mirror of claim 10 where at least two of said complementary magnetic elements surrounding each apeture in said base are positioned out of alignment with said complementary magnetic attachment means on said faceplate to permit said actuator to be magnetically unlatched from said complementary magnetic attachment means holding said faceplate to said actuator while still permitting said actuator to be retained in said base by said support means.

* * * * *